3,148,075
SIMULTANEOUS PREPARATION OF LINEAR QUINACRIDONES AND QUINACRIDONE-QUINONES
Felix Frederick Ehrich, Westfield, N.J., assignor to E. I. du Pont de Nemours and Company, Wilmington, Del., a corporation of Delaware
No Drawing. Filed Jan. 31, 1962, Ser. No. 170,222
7 Claims. (Cl. 106—288)

This invention relates to a process for the simultaneous preparation of a linear quinacridone and a quinacridone-quinone.

In U.S. Patent 2,821,529 to W. S. Struve, it is disclosed that linear dihydroquinacridone can be oxidized to linear quinacridone by subjecting the dihydro derivative to the action of a mild oxidizing agent, such as nitrobenzene-m-sodium sulfonate, in a liquid medium comprised of alkali, water, and an organic solvent, such as ethyl alcohol or ethylene glycol. This oxidation reaction is illustrated by the following equation:

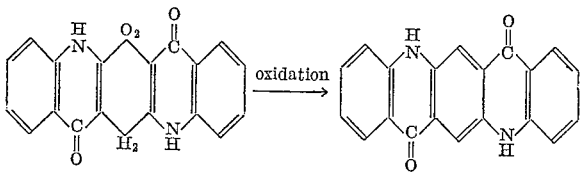

Another compound which is closely related in chemical structure to linear quinacridone is quinacridonequinone, which has the following formula:

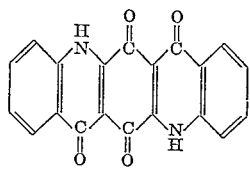

This compound has been known for many years, and its preparation is described by Sharvin in J. Rus. Phys. Chem. Soc. 47, 1260 (1915), C.A., vol. 9, 3056 (1915).

Mixtures of quinacridone and quinacridonequinone are used in the commercial manufacture of pigments. Previously, such mixtures have been formed by mixing separately prepared quinacridone and quinacridonequinone. The present invention presents a distinct advantage over the prior art methods of manufacture.

It has now been found that when a linear dihydroquinacridone is subjected to the action of certain oxidizing agents in water alkalized to a pH of greater than 13, a mixture of a linear quinacridone and a quinacridonequinone results. Therefore, the present invention is directed to a process for the simultaneous preparation of linear quinacridone having the following formula:

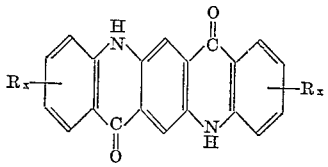

and quinacridonequinone having the following formula:

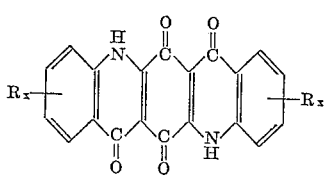

where R in both formulas is from the group consisting of hydrogen, halogen, lower alkyl, and lower alkoxy, and $x$ in both formulas is an integer of 1 to 2, inclusive. This process comprises heating, at temperatures of from about 60° C. to boiling in water alkalized to a pH of greater than 13, a dihydroquinacridone of the following formula:

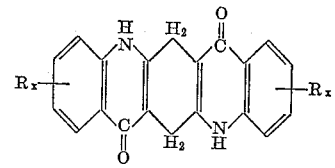

where R and $x$ have the meanings specified above, and an oxidizing agent selected from the group consisting of nitrobenzene, nitrobenzene-m-sodium sulfonate, p-nitrotoluene, m-nitrophenol, p-nitrobenzoic acid, m-nitrobenzoic acid, 4-nitrophthalic acid, and 2-methyl-5-nitrosodium-benzenesulfonate.

Dihydroquinacridones that can be oxidized according to this procedure include unsubstituted dihydroquinacridone and both symmetrically and unsymmetrically substituted dihydroquinacridone. Examples of these substituted dihydroquinacridones are 2,9-dimethyl-6,13-dihydroquinacridone, 2,9-difluoro-6,13-dihydroquinacridone, 2,9-dichloro-6,13-dihydroquinacridone, 4,11-dichloro-6,13-dihydroquinacridone, 4,11-dimethyl-6,13-dihydroquinacridone, 2,9-dimethoxy-6,13-dihydroquinacridone, and 4-chloro-6,13-dihydroquinacridone. In this invention, substituted dihydroquinacridones produce both a substituted quinacridone and a substituted quinacridonequinone wherein the substituents are in the same relative positions, respectively, as they are in the starting material.

The water in the above-described process can be alkalized to a pH of at least 13 by the addition of a strong alkali, such as sodium hydroxide or potassium hydroxide. Experience has shown that at lower pH's, a substantial amount of the dihydroquinacridone remains unreacted. Higher concentrations of alkali can be used, and, as will be shown later in this specification, when using dihydroquinacridone as the starting reactant, the concentration of the alkali influences the crystal phase of the quinacridone produced. This latter compound is known to exist in three different crystal phases which have been designated as the alpha, beta, and gamma crystal phases, and they are described in U.S. Patents Nos. 2,844,484, 2,844,485, and 2,844,581. Quinacridonequinone, the other end product, is not polymorphic. It is always obtained in the same crystal phase.

It should also be noted that dihydroquinacridone has two crystal phases, known as the alpha and beta phases. Alpha crystal phase dihydroquinacridone is described in U.S. Patent 3,009,916, and beta crystal phase dihydroquinacridone is described in U.S. Patent 3,007,930. As a general rule, when the alkali concentration is in the lower portion of the permissible range for this invention, such as 3%–15% NaOH or an equivalent alkali, alpha crystal phase dihydroquinacridone is converted to alpha crystal phase quinacridone whereas, under the same conditions, beta crystal phase dihydroquinacridone is converted to gamma quinacridone. At higher alkali concentration, about 15% or higher of NaOH or an equivalent alkali, the crystal phase of the dihydroquinacridone does not influence the crystal phase of the quinacridone produced. At these higher concentrations of alkali, the quinacridone is obtained in the beta crystal phase.

The amount of oxidizing agent used may vary over a wide range. As little as 1 mol of the oxidizing agent per mol of dihydroquinacridone will convert the dihydro derivative to quinacridone and quinacridonequinone. The upper range is governed by economic considerations since excess amounts do not harm the reaction. A preferred range is 1 to 2 mols of oxidizing agent per mole of dihydroquinacridone. Since most dihydroquinacridone compounds are fluorescent under ultraviolet light, this in general provides a convenient means for determining reaction time. The reaction is usually conducted until fluorescence is no longer evident. Longer reaction times do not, however, adversely affect the reaction. Usually, a reaction time in the range of 3 to 6 hours is sufficient, but, of course, such time will vary depending upon the temperature and the particular dihydro derivative being reacted.

The product obtained may be a physical mixture of a linear quinacridone and a quinacridonequinone, or it may be a solid solution of a quinacridone and a quinacridonequinone where one compound enters into the crystal lattice of the other. It is also possible to obtain a composition where a solid solution is physically admixed with a quinacridone or a quinacridonequinone or with both of these materials. The ensuing specification will illustrate the special conditions that can be used to produce solid solutions rather than a physical mixture. The products of this invention are useful as pigments, and the solid solutions are particularly preferred for this purpose.

One method for producing solid solutions comprises adding the alkali to the mixture of the other ingredients while they are at elevated temperatures, e.g., 80° C. to boiling and preferably 85–90° C. Also, the invention contemplates the presence of a small amount of an organic liquid in the reaction medium. This technique can also produce solid solutions. For instance, as will be seen from Example VIII, the addition of a small amount of ethylene glycol is capable of producing a solid solution.

Organic liquids that can be incorporated with the water include pyridine, water-soluble lower alkyl alcohols such as methyl alcohol, ethyl alcohol, isopropanol, the water-soluble polyhydric alcohols such as ethylene glycol and glycerol, and water-soluble monoalkylethers of ethylene glycol such as monomethylether of ethylene glycol and monoethylether of ethyleneglycol. The amount of organic liquid should be kept low (i.e., up to about 10% by weight, based on total weight of water and organic liquid). The use of larger amounts of such liquid in the reaction results in a linear quinacridone product rather than a mixture of quinacridone and quinacridonequinone. As previously mentioned, the production of linear quinacridone by the oxidation of a dihydroquinacridone in an alkali-water-alcohol medium is disclosed in U.S. Patent 2,821,529. Similar disclosures are also found in U.S. Patents 2,969,366 and 3,007,930.

The product can be isolated by filtration or other conventional means which are used for separating a solid from a liquid reaction medium. Isolation of the product by a procedure involving acidification of the oxidized mixture before filtration is preferred but is not essential. Quinacridonequinone forms a salt with strong alkalies, which salt is slowly hydrolyzed by water, so that long-continued washing is required to free the product from retained alkali when the mixture is filtered without acidification.

The physical mixtures of a linear quinacridone and a quinacridonequinone produced according to this invention can also be converted to solid solutions by milling techniques. For example, 10 parts of a physical mixture of 64 parts of beta phase quinacridone and 36 parts of quinacridonequinone can be salt-milled by mixing it with 1500 parts of small iron rods ("Cylpebs"), 87 parts of 20d nails, and 90 parts of dry sodium chloride, placing the mixture in a ball mill of such size that the mixture occupies about one-half the total volume of the interior of the mill, and rotating the mill for 48 hours in conventional fashion for milling. After milling, the mill charge is screened to remove rods and nails, and the screened charge is added to a mixture of 350 parts of water and 10.5 parts of sulfuric acid. The slurry is boiled for 2 hours and then filtered hot. The precipitate is washed salt-free and dried. The product is a maroon-colored pigment which has an X-ray diffraction pattern substantially different from that of a simple mixture of quinacridone and quinacridonequinone in the same proportions, indicating a solid solution of quinacridone and quinacridonequinone. The X-ray diffraction pattern is substantially that of pure quinacridonequinone, with a slight shift toward longer diffraction angles (smaller interplanar spacings) with the pattern of α-quinacridone only faintly evident.

Similar results are obtained on salt-milling other quinacridone-quinacridonequinone mixtures prepared by the methods described in this specification, except that the X-ray difffraction pattern of α- or β-quinacridone becomes clearly evident, in addition to the solid solution pattern, on increasing the proportion of quinacridone substantially above about 65%.

Pigmentary maroon-colored solid solutions can also be prepared from the quinacridone-quinacridonequinone mixtures prepared by the process of this invention by milling the mixtures with salt and a suitable organic liquid (dispersion milling) as also described in my copending application, Ser. No. 24,483. For example, 8 parts of the quinacridone-quinacridonequinone mixture is charged into a ball mill with 1000 parts of 1″ x ½″ "Cylpebs," 100 parts of 20d nails, 50 parts of hydrated aluminum sulfate [$Al_2(SO_4)_3 \cdot 18H_2O$], 13 parts of tetrachloroethylene and 0.4 part of Emcol P–10–59 (a surfactant from the Emulsol Corp.). The volume of the mill is such that the charge occupies approximately 60% of the total volume. The charge is milled for 12 hours with maintenance of the temperature in the range of 60° C.–70° C. On completion of milling, the powder is separated from the "Cylpebs" and nails by screening and is added to a solution of 320 parts of water and 20 parts of 98% sulfuric acid. The slurry is heated, with stirring, for approximately 2 hours at about 80° C., and is then filtered and the presscake washed free of sulfate. X-ray examination of the dried product shows it to have substantially the same X-ray diffraction pattern as quinacridonequinone. Similar results are obtained on dispersion milling other mixtures of quinacridone and quinacridonequinone, except that in some instances the X-ray diffraction pattern of quinacridone is evident in addition to that of the solid solution.

For a clearer understanding of the invention, the following specific examples are given. These examples are intended to be merely illustrative of the invention and not in limitation thereof. Unless otherwise specified, all parts are by weight.

This application is a continuation-in-part of my application Serial No. 24,483, filed April 25, 1960.

*Example I*

Alpha crystal phase 6,13-dihydroquinacridone is prepared as described in U.S. 3,007,930, by introducing 49.6 parts of diethyl 2,5-dianilino-3,6-dihydroterephthalate into 250 parts of a mixture comprising 23.5% biphenyl and 76.5% diphenyl oxide. The mass is then heated for 1 hour while maintaining an atmosphere of nitrogen gas in the reaction vessel. The charge is cooled to room temperature and diluted with about 100 parts of denatured ethyl alcohol and the alpha crystal phase of 6,13-dihydroquinacridone is recovered by filtering and washing with ethyl alcohol.

10 parts of the alpha crystal phase 6,13-dihydroquinacridone thus obtained is added at room temperature with stirring to 237 parts of a 13% solution of sodium hydroxide in water. 7.5 parts of nitrobenzene-m-sodium sulfonate is then added and the mixture is heated to the boil and boiled under reflux for approximately 3 hours until the fluorescence due to dihydroquinacridone is no longer evident when the mixture is examined under ultraviolet light. The slurry is then filtered, the precipitate is washed with water, and the washed material is dried at about 60° C. to yield 10 parts of product. The product obtained is much yellower in hue than quinacridone and exhibits the X-ray diffraction pattern characteristic of a mixture of α-quinacridone (see U.S. Patent 2,844,484) and quinacridonequinone.

*Example II*

Beta phase 6,13-dihydroquinacridone is prepared by a method described in U.S. 3,007,930 by subjecting alpha phase 6,13-dihydroquinacridone to the action of a relatively strong solution of an alkali in a suitable mixture of water and alcohol, as follows: 40 parts of alpha crystal phase 6,13-dihydroquinacridone is wet-up with a mixture of 320 parts of methanol and 93 parts of water. 18 parts of sodium hydroxide is then added and the mixture is stirred vigorously for about 1.5 hours. It is then diluted rapidly with 125 parts of water, and the slurry is stirred for a brief time while neutralizing to a pH of about 7.0 with dilute sulfuric acid. The beta phase dihydroquinacridone is then isolated by filtration, washing nad drying.

10 parts of the β-phase 6,13-dihydroquinacridone thus obtained is added at room temperature with stirring to 237 parts of a 13.0% solution of sodium hydroxide in water. 7.5 parts of nitrobenzene m-sodium sulfonate is then added and the mixture is heated to the boil and boiled under reflux for approximately 3 hours. The slurry is then filtered, the precipitate is washed with water, and the washed material is dried at about 60° C. to yield 10 parts of product. The product exhibits an X-ray diffraction pattern characteristic of a mixture of gamma phase quinacridone with quinacridonequinone.

*Example III*

A series of reactions is carried out where the concentration of the alkali is varied as shown in the table below. In these reactions, 10 parts of alpha phase 6,13-dihydroquinacridone is mixed at room temperature with 120 parts of sodium hydroxide solution and 20 parts of nitrobenzene-m-sodium sulfonate. 0.2 part of n-octanol is then added, as a foam inhibitor, and the mixture is then heated to the boil and boiled gently, with reflux, for 5 hours. The slurry is then cooled and the product is isolated by filtering, washing, and drying in conventional fashion. Yields are substantially quantitative. The products are identified through their ultraviolet and infrared absorption spectra. The table shows the effect of concentration of sodium hydroxide solution in this process.

| | NaOH Soln. | | Percent QA[1] | Percent QAQ[1] | Percent DQA[1] | Type of X-Ray Diffraction Pattern |
|---|---|---|---|---|---|---|
| | Conc., percent | pH | | | | |
| A | 1.5 | 12.9 | 55.1 | 21.5 | 23.4 | Reaction incomplete; not subjected to X-ray diffraction. |
| B | 2.4 | 13.0 | 61.6 | 21.3 | 17.1 | Do. |
| C | 3.3 | 13.1 | 73.2 | 26.8 | 0 | α-QA Pattern + QAQ. |
| D | 8.3 | 14.0 | 69.8 | 30.2 | 0 | Do. |
| E | 13.6 | 14.0 | 68.8 | 31.2 | 0 | Do. |
| F | 15.5 | 14.0 | 64.2 | 35.8 | 0 | β-QA Pattern + QAQ. |
| G | 18.7 | 14.0 | 64.7 | 35.3 | 0 | Do. |

[1] QA denotes quinacridone; QAQ denotes quinacridonequinone; DQA denotes dihydroquinacridone.

As shown in the table, a minimum sodium hydroxide concentration of about 3.0% is required for complete oxidation under these conditions. Starting with alpha phase 6,13-dihydroquinacridone, sodium hydroxide concentrations of 13.6% or less yield products with X-ray diffraction patterns corresponding to α-quinacridone mixed with quinacridonequinone. With β-6,13-dihydroquinacridone as the starting material, products with X-ray diffraction patterns corresponding to gamma quinacridone mixed with quinacridonequinone are obtained, at sodium hydroxide concentrations of 13.6% or less. With sodium hydroxide concentrations of 15.5% or greater, a product with the X-ray diffraction pattern of β-quinacridone (see U.S. Patent 2,844,485) mixed with the pattern of quinacridonequinone, is obtained by the method of this example starting with either α- or β-6,13-dihydroquinacridone. Detailed studies indicate a sodium hydroxide concentration of about 15.0% under the conditions described is a critical point, lower concentrations yielding products containing quinacridone in the alpha or gamma phase, and higher concentration yielding the quinacridone in the beta phase.

*Example IV*

10 parts of α-6,13-dihydroquinacridone is added at room temperature to 140 parts of a 14.3% solution of sodium hydroxide in water. 22.4 parts of p-nitrobenzoic acid and 0.8 part of n-octanol are then added and the resulting mixture is heated to 103° C. and refluxed at that temperature for five hours. The product is isolated in conventional manner by filtration, washing, and drying. The product obtained is a mixture of quinacridone and quinacridonequinone exhibiting the X-ray diffraction pattern characteristic of a mixture of α-quinacridone, β-quinacridone, and quinacridonequinone.

*Example V*

A mixture of 4,11-dimethylquinacridone and 4,11-dimethylquinacridonequinone is prepared as follows: 10.9 parts of 4,11-dimethyl-6,13-dihydoquinacridone, 20 parts of nitrobenzene-m-sodium sulfonate, and 0.2 part of n-octanol are added with stirring to 120 parts of 15.0% sodium hydroxide solution at room temperature. The mixture is heated to the boil and boiled gently, under reflux, for 5 hours. The product is then isolated in conventional fashion by filtering, washing, and drying. The product is shown by analysis to be a mixture of 4,11-dimethylquinacridone and 4,11-dimethylquinacridonequinone.

*Example VI*

10 parts of alpha phase 6,13-dihydroquinacridone is added to a solution of 28 parts of potassium hydroxide in 120 parts of water. 20 parts of nitrobenzene-m-sodium sulfonate is added to the mixture which is then heated to the boil and boiled, with reflux, for 5 hours, care being taken to avoid excessively violent boiling, which causes foaming. The slurry is filtered and the product is washed with water and dried in conventional fashion. Approximately 10 parts of product is obtained which by chemical analysis consists of about 65% alpha phase quinacridone and 35% quinacridonequinone.

*Example VII*

The temperature of addition of the alkali to the oxidation mixture influences the crystal structure of the oxidation product. This example shows addition of the alkali at 85° C.–90° C. with production of a solid solution of quinacridone and quinacridonequinone with substantially the X-ray diffraction pattern of α-quinacridone. A corresponding product may be a like procedure, except for addition of the alkali at room temperature, yields a mixture (rather than a solid solution) of α-quinacridone and quinacridonequinone.

10 parts of alpha phase 6,13-dihydroquinacridone and 20 parts of nitrobenzene-m-sodium sulfonate are added to 100 parts of water and the mixture is heated with stirring to 85° C.–90° C. .04 part n-octanol is then added to inhibit foaming, and 40 parts of 50% aqueous sodium hydroxide solution is added during approximately 2 minutes, maintaining the temperature below 102° C., to avoid foaming. The mixture is heated to 102° C., maintained at 100° C.–102° C. for 5 hours, under reflux, then cooled to about 40° C. and acidified to a pH of about 3.5, maintaining the temperature during acid addition below 70° C. The warm slurry is filtered and the product is washed with water and dried. The product contains approximately 65% quinacridone and 35% quinacridonequinone and has the X-ray diffraction pattern of α-quinacridone.

Example VIII

This example illustrates the effect of incorporating a small amount of organic solvent in the reaction medium.

10 parts of alpha phase 6,13-dihydroquinacridone is added to a mixture of 16 parts of Formula 2B alcohol (ethanol denatured with a small proportion of benzene), 80 parts of water, a solution of 20 parts of sodium hydroxide in 40 parts of water, and 20 parts of nitrobenzene-m-sodium sulfonate, at room temperature. The mixture is heated to the boil and boiled gently, with reflux, for 5 hours after which the product is isolated in conventional fashion by filtering, washing free of alkali, and drying. The product consists of about 73.5% quinacridone and 26.5% quinacridonequinone, and has an X-ray diffraction pattern which is substantially the same as that of β-quinacridone. A corresponding oxidation with use of an equal weight of water in place of the alcohol yields a product containing about 68% quinacridone and 32% quinacridonequinone and has the X-ray diffraction pattern of a mixture of α-quinacridone and quinacridonequinone.

Replacement of the 2B alcohol of the foregoing process with an equal volume of ethylene glycol yields a product which is a quinacridone-quinacridonequinone solid solution with an X-ray diffraction pattern essentially the same as that of α-quinacridone.

Dihydroquinacridones used as starting materials in this invention can be prepared by any convenient method. The procedures described in U.S. 2,821,529 and U.S. 3,007,930 are convenient to use, but other procedures are also applicable.

A strong alkali such as sodium hydroxide, potassium hydroxide, and the like, which can produce a pH of at least 13 is needed for satisfactory operation of the process of this invention. As mentioned earlier in this specification, lower pH's lead to incomplete oxidation of the dihydroquinacridone. When sodium hydroxide is used, a concentration of at least 3% is needed to give the required pH.

The crystal structure of the product and the ratio of quinacridone to quinacridonequinone varies with the concentration of alkali in the oxidation slurry. As can be seen from Example III, when sodium hydroxide is the alkali, and mixing of all the reactants is at room temperature, alkali concentrations in the range of about 3% to about 15% yield a mixture of alpha or gamma quinacridone (depending upon the phase of the dihydroquinacridone) with quinacridonequinone, whereas the quinacridone is in the β-phase when the sodium hydroxide concentration is in excess of about 15%. The proportion of quinacridonequinone in the product, under the aforementioned conditions, increases with increasing sodium hydroxide concentration up to a sodium hydroxide concentration of about 20%. Sodium hydroxide concentrations in excess of about 20% are not preferred because of increased cost and difficulty of obtaining complete oxidation.

Isolation of the product by a procedure involving acidification of the oxidized mixture before filtration is preferred but is not essential. Quinacridonequinone forms a salt with strong alkalies, and this salt is slowly hydrolyzed by water, so that long-continued washing is required to free the product from retained alkali when the mixture is filtered without acidification. If the oxidized mixture is acidified before filtration, the filtration rate is greatly increased. Acidification can be accomplished by cooling the oxidized slurry to room temperature and slowly adding sulfuric acid with stirring to bring the pH to approximately 4.0. The acidified slurry is then flooded with several volumes of cold water and filtered, and the product is isolated in conventional fashion. The product obtained is substantially the same as that obtained without the acidification step, but the overall isolation process is considerably shortened owing to more rapid filtration and washing after acidification.

The preferred procedure involves the use of an antiforming agent, such as n-octanol, etc., in the oxidation. The use of such an agent is an operating convenience and is not essential to the operation of the process.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for the simultaneous preparation of linear quinacridone having the following formula:

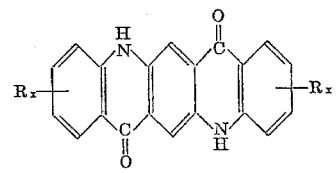

and quinacridonequinone having the following formula:

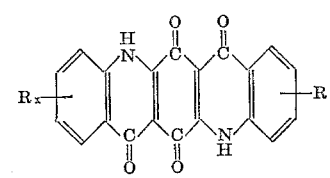

where R in both formulas is from the group consisting of hydrogen, halogen, lower alkyl, and lower alkoxy, and x in both formulas is an integer of 1 to 2, inclusive, said process comprising heating, at temperatures of from about 60° C. to boiling, in water containing no more than 10% by weight of organic liquid, based on the total weight of water and organic liquid, and alkalized to a pH of greater than 13, a dihydroquinacridone of the following formula:

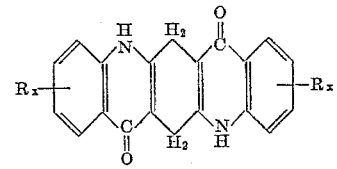

where R and x have the meanings specified above, and an oxidizing agent selected from the group consisting of nitrobenzene, nitrobenzene-m-sodium sulfonate, p-nitrotoluene, m-nitrophenol, p-nitrobenzoic acid, m-nitrobenzoic acid, 4-nitrophthalic acid, and 2-methyl-5-nitrosodiumbenzenesulfonate.

2. The process of claim 1 wherein there is present a small amount of an organic liquid from the group consisting of water-soluble lower alkyl alcohols, water-soluble monoalkylethers of ethylene glycol, and pyridine, the amount of said organic liquid being up to 10% by weight based on the total weight of water and organic liquid.

3. The process of claim 1 in which the water is alkalized with potassium hydroxide.

4. The process of claim 1 in which the water is alkalized with sodium hydroxide.

5. The process of claim 1 in which the water is alkalized with sodium hydroxide and the oxidizing agent is nitrobenzene-m-sodium sulfonate.

6. A process for the simultaneous preparation of linear quinacridone having the following formula:

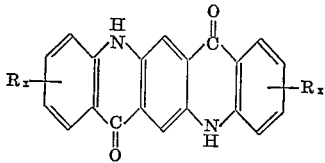

and quinacridonequinone having the following formula:

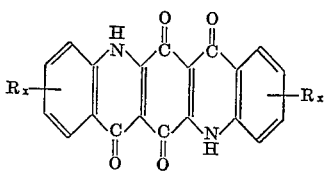

where R in both formulas is from the group consisting of hydrogen, halogen, lower alkyl, and lower alkoxy, and $x$ in both formulas is an integer of 1 to 2, inclusive, said process comprising heating a dihydroquinacridone of the following formula:

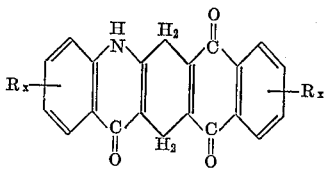

where R and $x$ have the meanings specified above, in water containing no more than 10% by weight of organic liquid, based on the total weight of water and organic liquid, and in the presence of an oxidizing agent selected from the group consisting of nitrobenzene, nitrobenzene-m-sodium sulfonate, p-nitrotoluene, m-nitrophenol, p-nitrobenzoic acid, m-nitrobenzoic acid, 4-nitrophthalic acid, and 2-methyl-5-nitrosodiumbenzene sulfonate, at temperatures of from about 60° C. to boiling, while said water mixture is in said temperature range adding thereto an alkali selected from the group consisting of sodium hydroxide and potassium hydroxide until the pH of the mixture is greater than 13.

7. The process of claim 6 in which the dihydroquinacridone is unsubstituted dihydroquinacridone, the oxidizing agent is nitrobenzene-m-sodium sulfonate, and the alkali is sodium hydroxide.

References Cited in the file of this patent
UNITED STATES PATENTS

| | | |
|---|---|---|
| 2,844,484 | Reidinger et al. | July 22, 1958 |
| 2,969,366 | Griswold et al. | Jan. 24, 1961 |
| 3,007,930 | Manger et al. | Nov. 7, 1961 |

UNITED STATES PATENT OFFICE
CERTIFICATE OF CORRECTION

Patent No. 3,148,075                          September 8, 1964

Felix Frederick Ehrich

It is hereby certified that error appears in the above numbered patent requiring correction and that the said Letters Patent should read as corrected below.

Column 1, lines 20 to 26, the first structural formula should appear as shown below instead of as in the patent:

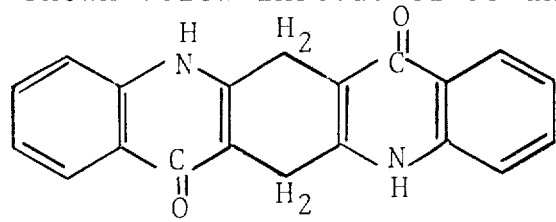

Signed and sealed this 29th day of October 1968.

(SEAL)
Attest:

Edward M. Fletcher, Jr.                      EDWARD J. BRENNER

Attesting Officer                                Commissioner of Patents